July 26, 1932.                I. LUDLOW                    1,869,326
              CONTROL SYSTEM FOR AIRPLANES AND THE LIKE
                       Filed Aug. 19, 1929            2 Sheets-Sheet 2
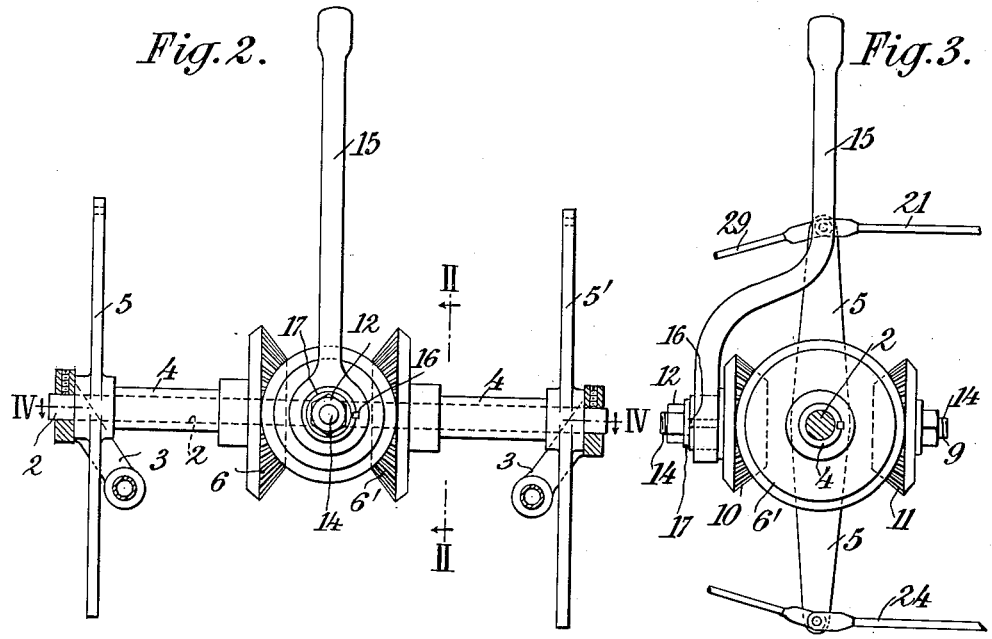
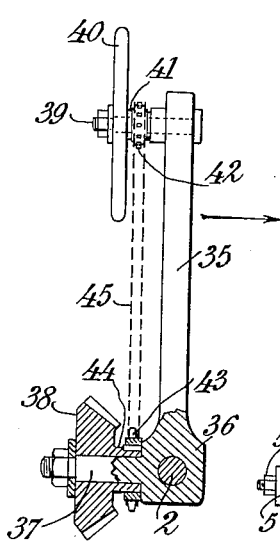
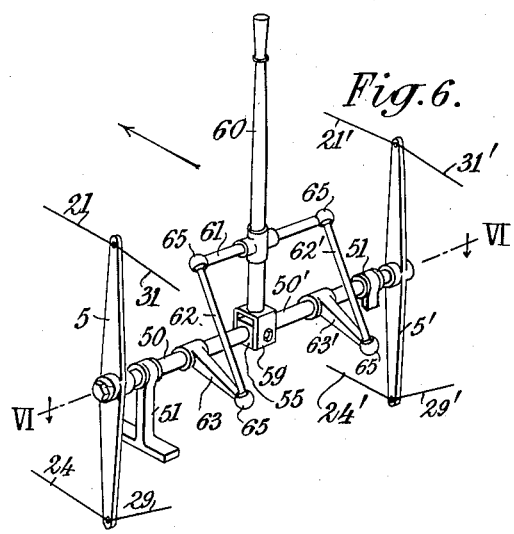
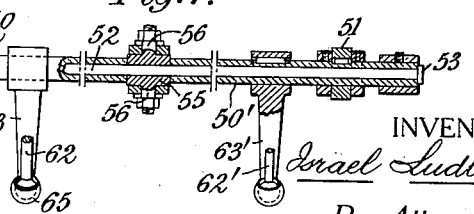
INVENTOR
Israel Ludlow,
By Attorneys,
Fraser Myers & Manley Patented July 26, 1932

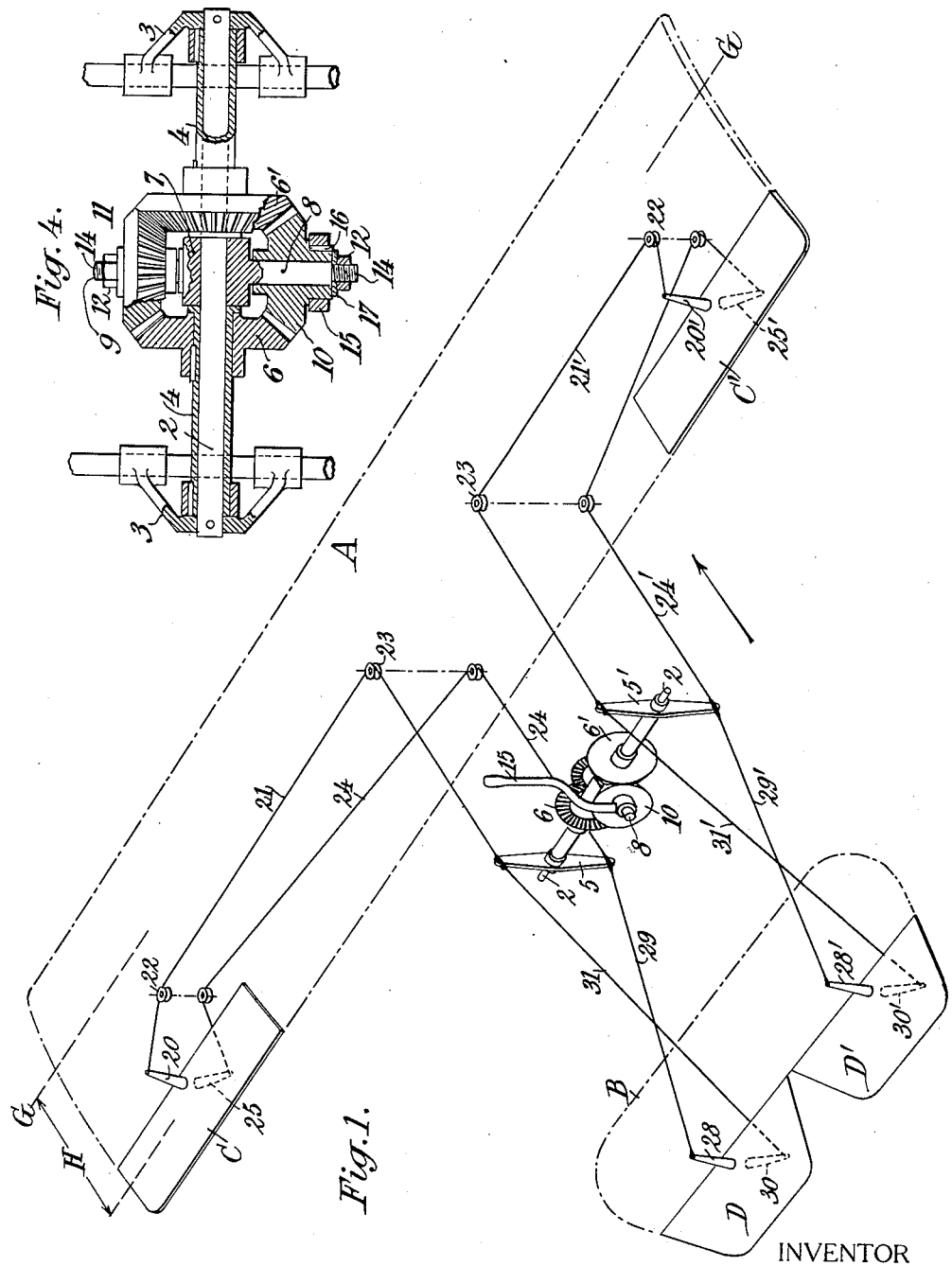

1,869,326

UNITED STATES PATENT OFFICE

ISRAEL LUDLOW, OF MINEOLA, NEW YORK, ASSIGNOR OF ONE-EIGHTH TO ARTHUR C. FRASER, OF RIDGEFIELD, CONNECTICUT, ONE-EIGHTH TO EUGENE V. MYERS, OF EAST ORANGE, NEW JERSEY, ONE-EIGHTH TO LOUIS E. GILES, OF NEW YORK, N. Y., AND ONE-EIGHTH TO BRYAN M. BATTEY, OF ASCAWANA, NEW YORK

CONTROL SYSTEM FOR AIRPLANES AND THE LIKE

Application filed August 19, 1929. Serial No. 386,832.

This invention relates to an equilibrium control for airplanes and other forms of aircraft.

One of the objects of my invention is to provide a system of equilibrium control which is operated by a single universally mounted vertical lever corresponding in its movements to the widely used "joy stick", and wherein the organs controlling respectively the transverse and longitudinal equilibrium of the machine are connected in such manner that each augments the action of the other; that is to say, the surfaces lying on each side of the longitudinal axis of the machine and which normally serve as horizontal rudders or elevators when moved in unison, may be differentially operated in conjunction with the ailerons or other means of controlling the transverse equilibrium of the machine, whereby to aid in the control of such equilibrium; and in the event of damage to the ordinary transverse equilibrium control, to take the place thereof. The transverse equilibrium control surfaces which ordinarily consist of ailerons or movable wing sections toward the outer ends of the airplane wings are, according to the present invention, also connected to the pilot's operating lever and to the organs at the tail of the machine which ordinarily control the longitudinal equilibrium, in such manner as to cooperate therewith, to increase the controlling effect thereof and to afford an emergency control for the longitudinal equilibrium in the event that the organs ordinarily employed for such purpose are damaged or rendered inoperative for any reason.

The invention further provides a novel differential driving system between the vertical control lever and the control surfaces operated thereby, whereby such surfaces may be simultaneously moved in the same direction or oppositely moved, depending upon whether the control lever is swung in a fore and aft vertical plane or in a transverse vertical plane. Oblique movements of the control lever will have components of motion in both said planes, and will consequently effect a movement of the surfaces which is the resultant of the differential and the similar response of the surfaces resulting respectively from the components of motion of the lever in the fore and aft and transverse vertical planes.

A further object of the invention is to provide control surfaces each of which may be employed selectively for controlling either the longitudinal or the transverse equilibrium of the airplane, or both equilibriums simultaneously, the said control surfaces being disposed in such position relative to the center of gravity of the machine, that each will exert a turning moment with respect to such center, about both a longitudinal and a transverse horizontal axis.

The invention further provides means for operating the control surfaces described in the foregoing paragraph whereby the surfaces may be caused to control either the longitudinal or transverse equilibrium of the machine, or both such equilibriums, without requiring any clutching or unclutching of independent controls or without making any special adjustment whatsoever in the single control lever, the movements of which corresponding with those of the usual "joy stick", other than the normal movement of such lever generally in the direction toward which the pilot desires to incline the machine. The rule for operating the control, according to the present invention in its preferred embodiment, is the same as that for operating the usual joy stick control, viz., tilt the lever in the direction you desire to tilt the airplane.

Certain features of my invention are applicable to operating systems other than those having the standard relationship between the movement of the control device operated by the pilot and the response of the airplane resulting therefrom. The means for selectively effecting a uniform or differential movement of the control surfaces may be operated by a wheel similar to that employed in the well known "Dep" control, which is employed on large heavy machines where greater power is required to operate the controls than can be conveniently attained through the use of a lever.

Other objects of the invention will be apparent from the following detailed description wherein reference is had to the accompanying figures in which:

Fig. 1 is a diagrammatic perspective view of an airplane equipped with one form of control system, according to the present invention.

Fig. 2 is a rear elevation of the vertical control lever and its operative connections with the cables which control the equilibrium organs.

Fig. 3 is a cross-section and side elevation of the mechanism shown in Fig. 2, the view being taken in the direction of the arrows on section line III—III.

Fig. 4 is a horizontal section taken along the line IV—IV of Fig. 2.

Fig. 5 is a side elevation and partial section of the control mechanism shown in the foregoing figures, so modified as to adapt it to a wheel or "Dep" type of control.

Fig. 6 is a perspective view of a modified form of control mechanism wherein the relationship between the movement of the control lever and the resulting response of the equilibrium control organs is the same as that obtained in the construction illustrated in Figs. 1 to 4 inclusive.

Fig. 7 is a plan view of the mechanism shown in Fig. 5, certain portions having been broken away to show a horizontal section along the line VI—VI of Fig. 5.

The control system, according to the present invention, is applicable to various types of aircraft but for the purpose of illustration and by way of example it is shown as applied to a monoplane airplane of conventional design. In Fig. 1, A represents the wing or main sustaining surface of the airplane. At some distance to the rear of such wing a horizontal tail plane or stabilizer B is provided, this stabilizer being normally carried at the extremity of the fuselage (not shown) or other suitable support extending rearwardly from the main sustaining surface. Toward the rear edge of the wing A there is provided at each end, a hinged flap or aileron, the left hand aileron, as viewed from the rear of the machine, being lettered C and the right hand aileron C'. To the rear of the stabilizer B are hinged elevator surfaces D, D', said surfaces being separately hinged so as to permit of their independent movement.

It will be understood that the terms aileron and elevator are used herein to describe control surfaces corresponding generally in form to surfaces commonly referred to by these terms in the art, but according to the present invention the said aileron and elevator surfaces are connected to the control device operated by the pilot, in such manner as to have, in addition to the usual functions of such surfaces, a different characteristic which permits the ailerons to serve as a means for controlling or aiding in the control of the longitudinal equilibrium; and permits of the independently movable elevator surfaces to control or aid in the control of the transverse equilibrium. These additional functions of the ailerons and elevator surfaces are achieved by the special operating mechanism which will now be described.

The principal elements of the operating mechanism by which the various movements are imparted to the control surfaces may be conveniently mounted upon the transverse horizontal shaft 2 secured at each end to the fuselage or frame members of the airplane by means of brackets 3. Toward each end of shaft 2, sleeves 4 are provided, said sleeves being freely rotatable about the shaft and carrying rigidly at their outer ends vertical cross-arms 5, 5' respectively, to the upper and lower ends of which are connected the cables by which the control surfaces are operated. At the inner ends of the sleeves 4 which constitute tubular rock-shafts, bevel gears 6, 6' are rigidly attached. Between the gears 6, 6' a collar 7 is provided, said collar serving as a spacer to hold the said gears and the sleeves 4, upon which they are mounted, against axial displacement relative to the supporting shaft 2, the outer ends of the sleeves abutting against the shaft supporting brackets 3 so that the several parts rotatable about shaft 2 are maintained in a fixed relationship axially of such shaft.

The collar 7, which is freely rotatable about shaft 2, carries fixed horizontal studs 8, 9 extending forwardly and rearwardly from said collar and upon said studs bevel pinions 10, 11 are mounted respectively, said pinions meshing with the bevel gears 6, 6' and being freely rotatable about the studs. The pinion hubs bear against the collar 7 at their inner ends, the pinions being retained on the studs by nuts 12 which are threaded onto the reduced end portions 14 of the studs.

The control lever 15 is rigidly secured to the hub portion of pinion 10 in any suitable manner. In the example shown, the lower end of lever 15 is enlarged and bored out so as to fit snugly over the pinion hub, a key 16 being provided to prevent relative displacement between the two. The lever 15 and the said key are held against axial displacement by means of a washer 17 which is held in place by nut 12 on the reduced end portion 14 of stud 8.

In the construction above-described, it will be apparent that a transverse movement of the control lever 15 will result in a rotation of pinion 10, which in turn oppositely or differentially rotates gears 6, 6', tubular rockshafts 4 and cross-arms 5. Swinging the lever longitudinally with respect to the machine (fore and aft as seen in Fig. 1 or to the right and left as seen in Fig. 3) causes the collar 7 and the studs 8, 9, secured thereto, to swing about the axis of shaft 2, the pinions 10, 11 being thus bodily carried about such axis and carrying with them the gears 6, 6', tubular rock-shafts 4 and cross-arms 5, 5' in such manner that the cross-arms execute a like angular movement, and in the same angular sense. It will be apparent that the pinion 11 serves merely as an idler to connect gears 6, 6' and its presence is not essential to the operativeness of the device. The idler pinion somewhat increases the factor of safety in the gearing inasmuch as it would afford an operative connection between the two gears which would insure their normal operation should the teeth of driving pinion 10 break down or become disengaged from the teeth of one or the other of gears 6, 6'.

As seen in Figs. 1 and 3, the lever 15 is bent or offset in such manner that the upper end of the lever in its neutral position, stands vertically over the axis of shaft 2 about which such lever swings when moved in a fore and aft plane. The advantage of this arrangement is that the movement of the lever corresponds with that of the usual vertically disposed joy stick, whereas if the lever were not offset but projected upwardly from the end of stud 8 it would have a more marked vertical component of motion when swung about the axis of shaft 2. This would not be a serious defect but would result in a path of movement of the lever differing somewhat from the arc through which the upper end of the usual joy stick control ordinarily traverses and to which the majority of pilots are accustomed. It will also be noted that the disposition of control lever 15 and the symmetrical arrangement of driving pinion 10 and idler pinion 11 result in a construction wherein the weight is almost equally distributed on each side of the supporting axis. If it were desired, the mechanism could be perfectly balanced by the addition of a suitable counter-weight. Any suitable connections may be provided between the gearing hereinbefore described and the various control surfaces operated thereby. A simple, light-weight and efficient, connection is provided in the system of wire cables illustrated in Fig. 1. In this construction each of the control surfaces C, C', D, D' is provided with horns extending above and below the said surfaces, said horns being rigidly secured to the frame-work of said surfaces. To the upwardly extending horns 20, 20' of ailerons C, C' are connected respectively cables 21, 21' which extend forwardly from said horns, thence around pulleys 22, thence transversely toward the center of the machine to pulleys 23, and rearwardly to the upper ends of vertical cross-arms 5, 5'. Similar cable connections 24, 24' are provided between the downwardly projecting horns 25, 25' of ailerons C, C' and the lower ends of the said vertical cross-arms 5, 5' which, as hereinbefore set forth, are rigidly connected with gears 6, 6'. The upwardly extending horns 28, 28' of the independently movable elevator surfaces D, D' are connected respectively by cables 29, 29' to the lower ends of cross-arms 5, 5', and the downwardly extending horns 30, 30' of elevator surfaces D, D' are connected respectively with the upper ends of cross-arms 5, 5' by cables 31, 31'.

With the cables arranged as above set forth it will be apparent that a swinging movement of the vertical cross-arm 5 about the axis 2 will result in angular movements of the aileron C and elevator flap D in the same angular sense; when the elevator is turned downwardly at its rear edge the aileron will be turned downwardly at its rear edge. When cross-arm 5 is swung in a counter-clockwise direction, as viewed in Fig. 1, aileron C and elevator flap D will simultaneously be swung upwardly at the rear.

The above description of the relationship between the movement of cross-arm 5 and the aileron and elevator surfaces C and D applies also to the relative movements of cross-arm 5' and the aileron and elevator surfaces C' and D'.

The gearing hereinbefore described, whereby the control lever 15 is operatively connected with the cross-arms 5, 5', is of such a character as to permit either the simultaneous uniform angular movement of the two cross-arms by movement of the lever fore and aft, or a differential movement of the cross-arms whenever the lever is swung from its vertical position in any direction other than a true fore and aft direction. If the lever is swung transversely the cross-arms will be moved in opposite directions and through equal angles; and if the lever is swung in any vertical plane intermediate the fore and aft and transverse planes the movement of the cross-arms will be the resultant of the components of such motion in the said fore and aft and transverse planes.

The aerodynamic effect of the elevator flaps D, D' when moved simultaneously up or down at their rear edges is well understood, the former movement causing the airplane to nose up and the latter causing the airplane to nose down. This is the usual method of controlling the longitudinal equilibrium or pitching of airplanes.

If the elevator flaps D, D' are moved oppositely, one up and one down, a force couple will be set up tending to cause the machine to roll about its longitudinal axis. Thus by affording a differential movement for the elevator flaps D, D', according to the present invention, said flaps provide a means for controlling the transverse equilibrium of the machine which supplements the usual transverse equilibrium controlling effect of the ailerons C, C'. Such aileron action is well understood and need not here be described. In addition to such usual effect of the ailerons, there is provided, according to the present invention, an additional function whereby the ailerons may be moved simultaneously in the same angular direction, instead of differentially as is ordinarily the case, and by such uniform angular movement the ailerons afford additional control of the longitudinal equilibrium of the airplane, which would normally supplement the action of the elevator surfaces D, D' but which in the event of damage to such surfaces afford an emergency control whereby the longitudinal equilibrium of the machine could be maintained by the pilot, just as in the case of the differential movement of the elevator flaps D, D' the transverse equilibrium of the airplane may be controlled in the event of the ailerons becoming inoperative for any reason.

The ailerons are capable of exerting forces having a controlling effect upon the longitudinal equilibrium of the airplane because of the fact that they are disposed at a considerable distance to the rear of the center of gravity of the machine, which center of gravity necessarily lies close to, or is coincident with, the center of pressure of the main sustaining surface or wing A. In the usual form of wing the center of pressure lies at a distance of approximately one third of the chord measured from the front or leading edge of the wing toward the rear edge, the exact position varying somewhat with the angle of attack of the wing upon the air through which the machine is traveling. The approximate location of the center of pressure is indicated by the line G—G in Fig. 1. It will be apparent that air forces acting upon the ailerons will have an effective moment arm H about the center of gravity of the machine whereby to afford substantial moments for the control of the longitudinal equilibrium. It will be obvious that such effect of the ailerons may be increased by increasing their size or by supporting them at a distance further removed from the axis G—G and the operativeness of the arrangement will be in no way affected if the ailerons are placed at a suitable distance in front of such axis instead of to the rear thereof as illustrated in Fig. 1, the operating connections being rearranged accordingly.

The operation of the airplane control has been set forth in connection with the foregoing description of its structure but may be briefly summarized as follows. The pilot occupies a position to the rear of the control lever 15 and grasps the upper end of it in one hand or the other, just as he would the lever in the well known joy stick control. If he wishes the machine to nose down he pushes the lever forwardly, this resulting in a bodily movement of pinion 10 about the axis 2, said pinion carrying with it the gears 6, 6' and effecting a simultaneous and like angular movement of the cross-arms 5, 5' which through their cable connections result in a downward swinging of the rear edges of both ailerons C, C' and both elevator flaps D, D'. As thus adjusted each of the four control surfaces exert moments of force about the center of gravity of the machine tending to cause the rear portion thereof to rise and the nose to fall. The rearward movement of the lever 15 has the reverse effect upon the control surfaces, thus causing the machine to nose up. Swinging the lever to the pilot's left causes aileron C and elevator flap D to be turned upwardly at the rear and aileron C' and elevator flap D' to be turned downwardly at the rear, this resulting from the differential movement of gears 6, 6' upon the turning of pinion 10 by the control lever 15 about the axis of stud 8 upon which the said pinion and lever are mounted. Thus swinging the lever to the left results in rolling the machine to the left, each of the four control surfaces contributing to such rolling effect. Swinging the lever to the right has the opposite effect upon the control surfaces, resulting in a roll to the right.

It will be understood that suitable means for controlling the direction of flight of the airplane must be provided; such means are, however, well understood and since they constitute no part of the present invention are not herein described. The usual form of vertically disposed rudder surface hinged to the rear of a vertical fin is a satisfactory arrangement, the rudder being controlled by a pivoted rudder bar operated by the pilot's feet.

In Fig. 5 there is shown a construction whereby the arrangement of equlibrium controlling organs, according to the present invention, may be operated by a wheel or "Dep" type of control. It will be understood that the only changes required to convert the construction illustrated in Figs. 1 to 4 inclusive into the wheel type of control are shown in Fig. 5, the remainder of the mechanism being the same as that shown in the preceding figures. In place of the control lever 15, which in the construction hereinbefore described was rigidly connected with pinion 10, a vertical control column 35 is rigidly secured to a collar member 36 which is freely rotatable about the supporting shaft 2 and takes the place of collar 7 in the previously described construction. Projecting horizontally from member 36 and at right angles to shaft 2 is a rigid stud 37 upon which is rotatably mounted a bevel pinion 38 which takes the place of bevel pinion 10 in the previous construction and in like manner meshes with the gears 6, 6'. At the upper end of column 35 a rigid horizontal spindle 39 is secured, the said spindle carrying the control wheel 40 which is freely rotatable thereon. To the hub portion 41 of wheel 40 a sprocket 42 is rigidly secured. A second sprocket 43 is rigidly secured to the hub portion 44 of bevel pinion 38 and the two sprockets are connected by an endless chain 45.

In this construction the column 35 is free to swing only in a fore and aft plane, i. e., a plane transverse to the axis 2. The wheel being mounted upon said column is thus free to be moved in a fore and aft direction, said wheel being also freely rotatable in a transverse plane about the axis of spindle 39. Pushing the wheel bodily forward swings column 35, member 36 and stud 37 in such manner as to cause pinion 38 to swing bodily upward about the axis 2, this resulting in a simultaneous and equal angular movement of gears 6, 6' with which such pinion cooperates, this having the effect, as hereinbefore set forth, of causing the machine to nose down. Pulling the control wheel bodily to the rear has the reverse effect. A rotation of the wheel about spindle 39 transmits through the chain drive 42, 43, 45 a rotation in the same direction to pinion 38. If the wheel is rotated clockwise as viewed by the pilot (viewed in the direction of the arrow in Fig. 5) the control surfaces will be adjusted in such manner as to tend to cause the machine to roll in a clockwise direction, the opposite rotation of the wheel having the reverse rolling effect.

In Figs. 6 and 7 there is illustrated a modified construction wherein the functions of the gears in the embodiment illustrated in Figs. 1 to 4 inclusive are performed in like manner by a system of links. It will be understood that in the modification now to be described, the control surfaces and the system of cables by which said surfaces are operated are similar to those hereinbefore described. The cross-arms 5, 5' to which the control cables are connected are secured respectively at the outer ends of axially aligned sleeves 50, 50'. The said sleeves, toward their outer ends, are rotatably mounted in brackets 51 secured to a fixed part of the machine. Extending through the said sleeves is a supporting shaft 52, the said shaft being secured against axial displacement by a flanged end 53 which engages the end of the sleeve 50', and by means of a nut 54 threaded onto the reduced end portion of said shaft, said nut engaging the outer end of sleeve 50. The sleeves are freely and independently rotatable with respect to shaft 52, as is also a square collar member 55 which is interposed between the inner ends of the sleeves and supported upon the said shaft. Transversely projecting studs 56 formed integrally with member 55 are engaged by forked end 59 of the vertical control lever 60. As thus mounted the lever is susceptible of universal movement, being free to swing in a fore and aft plane about the axis of shaft 52 and in a transverse plane about the axis of studs 56. At a point above the forked end of the lever, a cross-bar 61 is rigidly secured and the two ends of said bar are respectively connected by links 62, 62' with rearwardly projecting arms 63, 63' which are rigidly secured to the sleeves 50, 50', which carry cross-arms 5, 5' to which the control cables are connected. In order to permit of the relative angular movements between the ends of links 62, 62' and the members connected thereby, ball and socket joints 65 are provided.

The operation of the above-described modification is as follows: When the pilot swings the lever 60 forwardly (in the direction of the arrow in Fig. 6), the cross-bar 61 rigidly secured thereto will effect a like movement of links 62, 62', which through arms 63, 63' will impart similar and equal angular movements to the cross-arms 5, 5', with the result that the four controlled surfaces C, C', D, D' will be adjusted to cause the airplane to nose down. A rearward movement of the lever has the reverse effect and causes the machine to nose up. Swinging the lever in a clockwise direction as viewed by the pilot, causes cross-bar 61 to pull link 62 upwardly and to lower link 62', these movements resulting in a clockwise rotation of cross-arm 5' and an opposite rotation of cross-arm 5, as viewed in Fig. 6. As hereinbefore set forth such differential movement of the cross-arms results in an adjustment of the control surfaces tending to cause the machine to roll to the right, i. e., in the direction in which the control lever is inclined. The opposite swinging of the control lever causes the machine to roll to the left. As in the embodiment first described, oblique movements of the control lever 60 result in a compound controlling effect whereby both the longitudinal and transverse equilibrium of the airplane may be simultaneously controlled.

It will be apparent that any desired ratio of angular movement of the control lever to the resulting angular movement of the control surfaces may be obtained by suitably proportioning the various parts of the mechanism. The length of cross-arms 5, 5' may be varied with relation to the length of the horns carried by the control surfaces, to vary the ratio of lever movement to the corresponding response of the control surfaces, and the same result may be accomplished in the constructions which employ gearing by varying the relative dimensions of the driving pinion and gears. In the wheel control, illustrated in Fig. 5, the same result can also be accomplished by altering the driving ratio between sprockets 42 and 43, and in the modification illustrated in Figs. 6 and 7 by relatively varying the lengths of cross-bar 61 and arms 63, 63' which are actuated thereby through links 62, 62' respectively.

It will be understood that the control system according to the present invention, is applicable to various types of aircraft, the invention having been described as applied to an airplane of the monoplane type merely by way of example. Obviously, airplanes of the biplane or triplane type as well as others of unconventional forms could be controlled by the system hereinbefore set forth. In the appended claims wherever the word "vertical" is employed it will be understood that the term is not used to describe a necessarily strictly vertical member but merely one which extends in a generally upward direction approaching a true vertical line. The usual joy stick lever by which airplanes are controlled is commonly referred to as a "vertical" lever, although in fact it is seldom truly vertical and the word "vertical" is used herein in the same sense.

It will also be understood that wherever the expression "differentially moved" is employed herein, it is not necessarily intended to convey the idea that is expressed in strict aeronautical verbiage when ailerons for example are described as being differentially moved. The expression in this art has acquired a special limited significance conveying the thought that the aileron which is moved upwardly, swings through a greater angle than the other aileron which may move downwardly, or not move at all during the upward movement of the first mentioned aileron. The control, according to the present invention, may be designed to effect such a differential movement of the ailerons in the strict sense above defined, but wherever the expression "differentially moved" appears in the appended claims it is to be understood to mean that the elements which are differentially moved, are moving angularly with respect to each other and the movement of each with respect to a fixed plane may be of the same or different degree.

While three types of control, according to the present invention have been hereinbefore described, it will be understood that the invention is not limited thereto but may be otherwise variously modified or embodied without departing from the spirit thereof as set forth in the following claims.

What I claim is:

1. In an airplane having a fixed main sustaining surface and a horizontal stabilizing surface to the rear thereof, a movable equilibrium controlling surface toward each end of said sustaining surface and acting at a distance from the vertical transverse plane passing through the center of gravity of the airplane, a movable equilibrium controlling surface on each side of said stabilizing surface, and actuating means adapted when moved in one plane to simultaneously adjust all the said equilibrium controlling surfaces in such manner that each contributes a moment of force tending to cause the airplane to pitch about a transverse axis, said actuating means being adapted, when moved in a plane at right angles to said first-mentioned plane, to oppositely adjust the equilibrium controlling surfaces on one side of the airplane relative to those on the other, in such manner that each contributes a moment of force tending to cause the airplane to roll about its longitudinal axis.

2. In an airplane, a main sustaining surface disposed so as to intersect an imaginary transverse vertical plane passing through the center of gravity of the airplane, a movable equilibrium-controlling surface toward each end of said sustaining surface and each at a distance from the said transverse vertical plane, two other equilibrium-controlling surfaces located at a materially greater distance from the said vertical plane, and actuating means adapted when moved in one plane to adjust all the said equilibrium-controlling surfaces so that each contributes a moment of force in a common angular sense to control the longitudinal equilibrium of the airplane, said actuating means being further adapted when moved in a different plane to adjust all the said controlling surfaces so that each contributes a moment of force in a common angular sense to control the transverse equilibrium of the airplane.

In witness whereof, I have hereunto signed my name.

ISRAEL LUDLOW.